United States Patent
Harrington et al.

(10) Patent No.: US 6,399,554 B1
(45) Date of Patent: Jun. 4, 2002

(54) CLEANING COMPOSITION FOR REMOVING ADHESIVES

(75) Inventors: John Harrington, Chester; Melissa L. Sardina, North Brunswick; David W. Lydzinski, Belle Mead, all of NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 173 days.

(21) Appl. No.: 09/590,912

(22) Filed: Jun. 9, 2000

(51) Int. Cl.[7] .......................... C11D 3/22; C11D 77/04; C23G 3/22
(52) U.S. Cl. ........................................ 510/200; 510/245
(58) Field of Search ................................ 510/200, 245

(56) References Cited

U.S. PATENT DOCUMENTS

| | | | | |
|---|---|---|---|---|
| 4,149,986 A | * | 4/1979 | Dickson | 252/108 |
| 5,622,872 A | * | 4/1997 | Ribi | 436/518 |
| 6,258,872 B1 | * | 7/2001 | Stedronsky | 523/118 |

* cited by examiner

*Primary Examiner*—Yogendra N. Gupta
*Assistant Examiner*—John M Petruncio
(74) *Attorney, Agent, or Firm*—Thomas F. Roland, Esq.

(57) ABSTRACT

A cleaning composition is presented for removing an adhesive from hard substrates. The cleaning solution contains 25 to 98 percent by weight of water, 5 to 74 percent by weight of a chaotropic agent, and 0.001 to 10 percent by weight of at least one surfactant. The cleaning composition is especially effective in removing aqueous-based resin adhesives from machine parts.

12 Claims, No Drawings

CLEANING COMPOSITION FOR REMOVING ADHESIVES

FIELD OF THE INVENTION

This invention relates to a cleaning solution that is useful for removing adhesives from the surfaces of hard substrates.

BACKGROUND OF THE INVENTION

Adhesives are often applied industrially by a process involving transferring a wet adhesive to a machine part, then transfering the adhesive from the machine part to the material being adhered. For example, in the process of applying labels to beverage containers, high speed machines are used which transfer adhesive films, while wet, to pallets. The adhesive is then transfered from the pallet to a label picked from a label stack. Once coated with adhesive, the label is contacted with a container for permanent adhesion.

Machine parts which come in contact with adhesives need regular cleaning and maintenance on both a daily and longer-term basis to remove residual and built-up adhesive. The adhesives can be difficult to remove from machine parts, and the cleaning process is sometimes time-consuming. Conventional cleaning methods are not adequate for removing many adhesives, such as resin adhesives frequently used in the bottle labeling market. Solvents and harsh abrasives clean well, but can deteriorate machine parts, such as rubber pallets.

U.S. Pat. No. 4,370,174 describes the removal of adhesives from floors with a cleaning solution containing 40–80 weight percent of an organic solvent, an inorganic solid absorbent powder, and two surfactants. Such a solution contains both organic solvents and abrasives, which tend to deteriorate rubber parts often found on machinery.

U.S. Pat. No. 6,017,863 describes an aqueous cleaning solution for removing uncured adhesive resins from substrates. The cleaning solution contains a surfactant mixture of N-alkyl-2-pyrrolidone and an aminocarboxylic acid surfactant. It has been found, however, that aqueous surfactant solutions containing only surfactants and water are ineffective for removing many adhesives, and especially resin-based adhesives.

The problem solved by the present invention was to find a cleaning solution which effectively removes the adhesive from machine parts without damaging said parts. Surprisingly it has been found that an aqueous solution of a chaotropic agent and some surfactant is effective in removing many types of aqueous-based adhesives from the surfaces of hard substrates. Some advantages seen with the cleaning composition of the present invention are that it provides a effective cleaning solution for cleaning surfaces of hard-to-remove adhesives, it doesn't harm hard surfaces, and it is safer than volatile compositions currently in use.

SUMMARY OF THE INVENTION

Accordingly it is an object of the present invention to provide an aqueous cleaning solution effective in removing adhesives from a hard substrate, and especially resin-based adhesives, from hard substrates. Specifically the invention provides a cleaning composition for removing adhesive from a hard substrate comprising:
  a) 25 to 98 percent by weight of water;
  b) 5 to 74 percent by weight of a chaotropic agent; and
  c) 0.001 to 10 percent by weight of a surfactant.

Another object of the present invention is directed to a method for removing an adhesive from a hard substrate comprising forming a cleaning composition comprising:
  a) forming a cleaning composition comprising:
    1) 25 to 98 percent by weight of water;
    2) 5 to 74 percent by weight of a chaotropic agent; and
    3) 0.001 to 10 percent by weight of a surfactant; and
  b) contacting said cleaning composition with an adhesive on a hard substrate.

DESCRIPTION OF THE INVENTION

The cleaning composition of the present invention is an aqueous solution containing a chaotropic agent and a surfactant.

A chaotropic agent is a chemical having hydrogen bonding capability, and that capability can be used to break apart molecules. Chaotropic agents loosen intermolecular and intramolecular interactions, such as hydrogen bonds and dipoles, forcing molecules to break apart. While not being bound to any theory, it is believed that chaotropic agents of the present invention act to break apart adhesive molecules by reducing and breaking hydrogen bonding and other interactions, making the adhesives easier to clean from surfaces.

The cleaning composition of the present invention contains from 5 to 74 percent by weight of a chaotropic agent, preferably 10 to 50 percent by weight. Preferred chaotropic agents for use in the cleaning solution include urea and guanadine hydrochloride, most preferably urea.

The cleaning composition of the present invention also includes at least one surfactant. Any surfactant is useful in the invention, including anionic, cationic, non-ionic, or amphoteric surfactants, or mixtures thereof. Preferred surfactants include anionic and non-ionic surfactants, most preferably anionic surfactants. The surfactant is present at from 0.001 to 10 weight percent of the solution, depending on the surfactant. A preferred surfactant concentration is from 0.5 to 2 percent by weight.

In addition to the chaotropic agent and surfactant, the aqueous cleaning solution of this invention may contain one or more additives conventionally used in aqueous cleaning solutions. Such additives include, but are not limited to, polysaccharides, d-limonene, solvents, perfumes, masking agents, defoamers, and preservatives.

Polysaccharide additives are useful in the cleaning solution. A preferred polysaccharide is starch. Polysaccharides are preferably present in the cleaning composition at up to 5 percent by weight, and most preferably at up to 2 percent by weight of the cleaning solution.

Solvents and masking agents known in the art may also be used in the cleaning composition. These additives include ethanol and polypropylene glycol.

Defoamers for use herein include stearates, silicone oils and adducts of ethylene oxide or propylene oxide with a $C_{12-18}$ fatty alcohol. Defoamers in the present invention are preferably used at up to 1 percent by weight of the cleaning solution.

Preservatives for use herein include those conventionally used in aqueous adhesives such as benzoates, amides and fluorides. Also included are the hydroxybenzoic acid esters such as p-hydroxybenzoic acid methyl ester or p-hydroxybenzoic butyl ester. The preservatives may be present at up to 0.5 percent by weight in the cleaning composition.

The cleaning composition may be formed by several methods known in the art, including, but not limited to, combining the components with stirring, and forming an aqueous concentrate which is then diluted with water to form an aqueous solution.

An example of a process for forming the cleaning composition of the present invention would be to combine 49.35 percent by weight of water with 49.35 percent by weight of urea, based on the total cleaning composition, heating the combination to 110° F., and then stirring for 20 minutes. To the aqueous urea solution are then added 1.0 percent of a sodium sulfosuccinate solution, 0.2 percent of a defoamer, and 0.1 percent of a preservative, by weight based on the total cleaning composition, and the mixture is then stirred for 30 minutes to form the cleaning composition.

The present invention is also directed to a process for removing adhesives from the surfaces of hard substrates.

Adhesives removable by the cleaning composition of the present invention are aqueous-based solution and emulsion adhesives. The adhesives are removable with the cleaning composition when they are in both the wet and dry state. These include, but are not limited to: synthetic adhesives based on ethylene vinyl acetate, polyvinyl alcohol, polyvinyl acetate, acrylics and polyurethane; resin products; animal glues; and natural polymers, such as those based on casein and starch. Aqueous-based adhesives may be formulated with additives such as tackifiers, thickeners, plasticizers, defoamers, preservatives, rheology modifiers, humectants, fillers, crosslinkers utilized in conventional amounts. The cleaning solution of the invention is useful in removing adhesives used in many areas of manufacturing including, for example, bottle labeling, tissue towel, cigarettes, bag lamination, envelopes, non-contact extrusion, folding cartons, window patch, lumber and wood, folding carton wheel and pressure sensitive label adhesive applications.

The cleaning solution of the present invention is useful for cleaning adhesives from the surfaces of hard substrates. Hard substrates include machine parts, floors, counters, tanks, tank trucks, tableware, piping and other hard materials which may be intentionally or accidentally contacted with an adhesive. Machine parts include those parts made of stainless steel, aluminum and other metals and alloys, ceramics, stone, and rubber, such as neoprene and nitrile rubber. The cleaning solution is also useful in the removal of adhesives from other hard substrates such as glass and plastics.

The cleaning solution of the invention is used to remove adhesive from surfaces of hard substrates by contacting the solution with the adhesive on said surfaces. The cleaning solution may be applied to the hard substrate by any method known in the art. Examples of such methods include, but are not limited to, immersion techniques, spray techniques including both hosing or pumping from a pump bottle, and mechanical brushing. The addition of energy increases the effectiveness of the cleaning solution in removing adhesives. Such energy may be added in the form of mechanical energy, such as stirring or scrubbing; heating the solution to temperatures below the boiling point of the cleaning composition; sonic energy, or any other energy form known in the art.

In practice, the cleaning composition may also be used in a diluted form. One method for using the cleaning composition is to add the composition to a tank which contains water. This may be followed by heating and/or stirring, such as in a boil out. The water can then be drained from the tank.

EXAMPLES

In the following examples, cleaning solutions were formed and tested for their ability to remove various adhesives from several hard substrates. In each case, the cleaning solution was formed by first adding water to a beaker, followed by the dispersion of the chaotropic agent in the water with stirring for about 20 to 30 minutes. The surfactant was then added with stirring for about 20 to 30 minutes, to form the cleaning solution. All percentages are given in weight percent.

Each solution was tested on either rubber pallets, metal or rubber sheets, or a combination thereof. On rubber pallets, a 2.0 mil thick film was first drawn on a glass plate. Then a 2.75×4.75×0.25 inch NBR-40D rubber pallet from a Krones Inc. rotary bottle labeling machine was then rolled several times through the film to produce a consistent coating on the pallet. On stainless steel, aluminum, or rubber plates, an adhesive film of the desired thickness was drawn onto the plate. The films on either the pallets or plates were allowed to dry for 10 minutes at room temperature. The test solution was sprayed onto the test pallet or plate just enough to coat the adhesive, then scrubbed with a stiff brush. Small doses of warm water were added directly from a faucet to the pallet occasionally to remove foam, and to enable observation of any remaining adhesive. Following each rinse, the pallet was again sprayed with the test cleaning composition, and scrubbing continued until the adhesive was removed. Once the adhesive was removed, the pallet was rinsed thoroughly with warm water from a faucet to remove all of the cleaning solution. The pallets were then dried at room temperature, and tested for residual tack.

Two measurements were made and recorded. The first was the time required to remove the adhesive from the pallet. The second was residual tack. Residual tack is a measure of the tackiness remaining once the cleaned pallet is dried. The residual tack was measured by pressing a finger against the dried pallet and determining the tackiness of any remaining adhesive on the surface. Observations were recorded as tack-free (TF), little tack (L), some tack (S), moderate tack (M), and aggressive tack (A), in order of increasing levels of residual tack. Other observations were also recorded.

Control solutions included: water—pallets were scrubbed directly under a flow of warm water from the faucet; and detergent—the detergent used was SOFTCIDE which is a mild detergent from Stahmer Western Scientific. The detergent is a thick liquid and was pumped from its container in an amount to cover the pallet.

Example 1

This Example compares the effectiveness of the cleaning solution of the invention with several comparative solutions. The solutions listed were tested for cleaning effectiveness using an NBR-40D rubber pallet coated from a 2.0 mil thick film of IMPERVO formulated ethylene vinyl acetate emulsion resin-based adhesive, used in the bottle labeling market. AEROSOL OT-75 PG, is sodium sulfosuccinate with propylene glycol and water. The results, listed in Table 1, show that cleaning compositions having water, urea, and an anionic surfactant are superior to the comparative solutions. Both Examples 1B, and 1D resulted in the adhesive balling up and smeared on the pallet, as noted by an (*).

TABLE 1

|  | 1A | 1B (Comp) | 1C (Comp) | 1D (Comp) |
|---|---|---|---|---|
| Water | 49.5 | 50 | — | 100 |
| Urea | 49.5 | 50 | — | — |
| AEROSOL OT-75 PG | 1.0 | — | — | — |
| Mild detergent | — | — | 100 | — |
| Time to clean, sec | 37–38 | 48–49 | 41–42 | 56–57 |
| Residual Tack | L | A* | L | A* |

Example 2

This example compares different concentrations of urea in the cleaning solution. The solutions listed were tested for cleaning effectiveness effectiveness using an NBR-40D rubber pallet coated from a 2.0 mil thick film of IMPERVO resin-based adhesive. MONOWET MO-70-R, is dioctyl sodium sulfosuccinate. The results, listed in Table 2, show the effect of different water/urea ratios in the cleaning solution of the present invention.

TABLE 2

|  | 2A | 2B | 2C | 2D |
|---|---|---|---|---|
| Water | 49.5 | 74.5 | 84.5 | 94.5 |
| Urea | 49.5 | 24.5 | 14.5 | 4.5 |
| MONOWET MO-70R | 1.0 | 1.0 | 1.0 | 1.0 |
| Time to clean, sec | 15–16 | 29–30 | 38–39 | 49–50 |
| Residual tack | S | A | A | A |

Example 3

This example examines the effect of different levels of d-limonene in the cleaning solution of the invention. Each of the solutions listed was tested for cleaning effectiveness using an NBR-40D rubber pallet coated from a 2.0 mil thick film of IMPERVO resin-based adhesive. The solutions tested are listed in Table 3. Each of the solutions removed adhesive from the rubber pallet.

TABLE 3

|  | 3A | 3B | 3C | 3D |
|---|---|---|---|---|
| Water | 49.0 | 49.25 | 49.33 | 49.45 |
| Urea | 49.0 | 49.25 | 49.33 | 49.45 |
| MONOWET MO-70R | 1.0 | 1.0 | 1.0 | 1.0 |
| D-limonene | 1.0 | 0.5 | 0.25 | 0.1 |

Example 4

This example examines the cleaning solution of the invention with added starch. The solutions listed were tested for cleaning effectiveness using an NBR-40D rubber pallet coated from a 2.0 mil thick film of IMPERVO resin-based adhesive. The results, listed in Table 4, show that starch has a positive effect on the cleaning solution of the present invention. While the cleaning times of the two compositions are nearly the same, the residual tack was found to be much less for the composition containing starch.

TABLE 4

|  | 4A | 4B |
|---|---|---|
| Water | 49.01 | 49.5 |
| Urea | 49.5 | 49.5 |
| AEROSOL OT-PG 75 | 1.0 | 1.0 |
| Starch | 0.49 | — |
| Time to clean, sec | 27–28 | 28–29 |

Example 5

This example compares the effectiveness of the cleaning solution on different adhesives, and on different substrates. A NBR40D rubber pallet was coated from a 2.0 mil thick film of four of the adhesives. A 3.0 mil thick film of each adhesive was drawn on an aluminum, and on a stainless steel plate. The results, listed in Table 5, show that the cleaning solution of the present invention is effective in the cleaning of a variety of aqueous adhesives from a variety of substrates. CYCLOFLEX adhesive is a formulated polystyrene butyl acrylate emulsion used in the bottle labeling industry. COL-TITE is a formulated starch, and COL-TITE is a formulated casein emulsion adhesive. Smearing of the rubber pallet and balling up was noted (*) for warm water (5D) and the IMPERVO resin-based adhesive, warm water and the CYCLOFLEX resin-based adhesive, and solution 5B and the IMPERVO resin-based adhesive.

TABLE 5

|  | 5A | 5B (comp) | 5C (comp) | 5D (comp) |
|---|---|---|---|---|
| Water | 49.5 | 50 | — | 100 |
| Urea | 49.5 | 50 | — | — |
| AEROSOL OT-PG 75 | 1.0 | — | — | — |
| Detergent | — | — | 100 | — |
| IMPERVO resin-based adhesive Rubber pallet | | | | |
| Time to clean, sec | 28–29 | 48–49 | 41–42 | 56–57 |
| Residual Tack | S | A* | S | A* |
| Aluminum plate | | | | |
| Time to clean, sec | 13–14 | 16–19 | 12–13 | 15–16 |
| Stainless steel plate | | | | |
| Time to clean, sec | 13–14 | 19–20 | 16–17 | 15–16 |
| CYCLOFLEX resin-based adhesive Rubber pallet | | | | |
| Time to clean, sec | 9–10 | 30–31 | 20–21 | 13–14 |
| Residual Tack | S | M | S | S* |
| Aluminum plate | | | | |
| Time to clean, sec | 11–12 | 9–10 | 12–13 | 11–12 |
| Stainless steel plate | | | | |
| Time to clean, sec | 8–9 | 10–11 | 9–10 | 7–8 |
| COL-TITE starch adhesive Rubber pallet | | | | |
| Time to clean, sec | 10–11 | 9–10 | 8–9 | 11–12 |
| Residual Tack | TF | TF | TF | TF |
| Aluminum plate | | | | |
| Time to clean, sec | 15–16 | 19–20 | 16–17 | 15–16 |
| Stainless steel plate | | | | |
| Time to clean, sec | 10–11 | 18–19 | 15–16 | 17–18 |

TABLE 5-continued

|  | 5A | 5B (comp) | 5C (comp) | 5D (comp) |
|---|---|---|---|---|
| COL-TITE casein-based adhesive Rubber pallet |  |  |  |  |
| Time to clean, sec | 4–5 | 10–11 | 9–10 | 12–13 |
| Residual Tack | TF | TF | TF | TF |
| Aluminum plate |  |  |  |  |
| Time to clean, sec | 9–10 | 11–12 | 11–12 | 10–11 |
| Stainless steel plate |  |  |  |  |
| Time to clean, sec | 9–10 | 12–13 | 9–10 | 8–9 |
| Animal glue - from animal parts Aluminum plate |  |  |  |  |
| Time to clean, sec | 15 | — | — | 19 |
| Stainless steel plate |  |  |  |  |
| Time to clean, sec | 16 | — | — | 25 |

Example 6

This example compares the effect of the cleaning solution containing different chaotropic agents, and cationic and non-ionic surfactants, on different substrates. 2.0 mil draw downs of IMPERVO resin-based adhesive were made on a glass plate, then an NBR-40D rubber pallet was rolled through the adhesive, and allowed to dry for 10 minutes. A 1.5 mil thick film of the adhesive was also drawn on a stainless steel plate. The results, listed in Table 6, show that the cleaning composition of the present invention, having different chaotropic agents and surfactants, is effective in the cleaning of aqueous adhesives from a variety of substrates. IGEPAL CO-887 is nonylphenoxypoly(ethyleneoxy) ethanol.

TABLE 6

|  | 6A | 6B | 6C | 6D | 6E comp |
|---|---|---|---|---|---|
| Water | 49.5 | 49.5 | 49.5 | 49.5 | 100 |
| Urea | 49.5 | — | 49.5 | 49.5 | — |
| Guanadine hydrochloride | — | 49.5 | — | — | — |
| AEROSOL OT-PG 75 | 1.0 | 1.0 | — | — | — |
| IGEPAL CO-887 | — | — | 1.0 | — | — |
| Dodecyltrimethyl ammonium bromide | — | — | — | 1.0 | — |
| Rubber pallet |  |  |  |  |  |
| Time to clean, sec | 21 | 23 | 29 | 33 | 67 |
| Residual tack | S | M | S | S | A |
| Stainless steel pallet |  |  |  |  |  |
| Time to clean, sec | 14 | 12 | 17 | 16 | 24 |

Example 7

This example demonstrates the effectiveness of the cleaning solution of the instant invention on a variety of adhesives, and on several different substrates (stainless steel, neoprene rubber, and nitrile rubber). For three of the adhesives, a 2.0 mil draw down of the adhesive was made on each of two different rubber plates. For each adhesive a 1.5 mil draws down of the same adhesive were made on stainless steel plate. Each adhesive/substrate combination was cleaned with a cleaning solution containing 49.5% water, 49.5% urea, and 1.0% Aerosol OT-PG 75, and was also cleaned with water. The results are found in Table 7.

| Market Area | Chemistry |
|---|---|
| 7A Tissue towel, ply bonding | Formulated ethylene vinyl acetate emulsion |
| 7B Cigarette packaging | Formulated ethylene vinyl acetate emulsion |
| 7C Bags/laminating | Formulated ethylene vinyl acetate emulsion |
| 7D Envelopes | Formulated carboxylated acrylate copolymer |
| 7E Non-contact extrusion folding carton | Formulated ethylene vinyl acetate emulsion |
| 7F Folding Carton window patch | Formulated carboxylated acrylate copolymer |
| 7G Lumber & wood millwork | Formulated polyvinyl acetate/n-methylol acrylamide emulsion |
| 7H Folding carton-wheel | Formulated polyvinyl acetate/acrylate emulsion |
| 7I Pressure sensitive label adhesive (PSLA) | Acrylic solution pressure sensitive adhesive |
| 7J Pressure sensitive label adhesive (PSLA) | Acrylic solution pressure sensitive adhesive |

TABLE 7

| Cleaning time, sec. | 7A | 7B | 7C | 7D | 7E | 7F | 7G | 7H | 7I | 7J |
|---|---|---|---|---|---|---|---|---|---|---|
| Stainless Steel |  |  |  |  |  |  |  |  |  |  |
| Cleaning Sol. | 5 | 10 | 14 | 19 | 6 | 18 | 12 | 12 | 51 | 150 |
| Water | 7 | 16 | 22 | 25 | 10 | 21 | 25 | 24 | 105 | 180+ |
| Neoprene Rubber |  |  |  |  |  |  |  |  |  |  |
| Cleaning Sol. | 14 |  | 55 |  |  | 17 |  |  |  |  |
| Water | 17 |  | 134 |  |  | 27 |  |  |  |  |
| Nitrile Rubber |  |  |  |  |  |  |  |  |  |  |
| Cleaning Sol. | 16 |  | 42 |  |  | 13 |  |  |  |  |
| Water | 21 |  | 62 |  |  | 19 |  |  |  |  |

What is claimed is:

1. A cleaning composition for removing an adhesive from a hard substrate comprising:

b) 25 to 98 percent by weight of water;

c) 5 to 74 percent by weight of a chaotropic agent; and d) 0.001 to 10 percent by weight of at least one surfactant.

2. The composition of claim 1 wherein said chaotropic agent comprises urea or guanadine hydrochloride.

3. The composition of claim 1 comprising 10 to 50 percent by weight of said chaotropic agent.

4. The composition of claim 1 wherein said surfactant is an anionic or non-ionic surfactant.

5. The composition of claim 1 comprising 0.5 to 2 percent by weight of said surfactant.

6. The composition of claim 1 further comprising a polysaccharide, d-limonene, a solvent, a perfume, a masking agent, a defoamer, a preservative, or a mixture thereof.

7. The composition of claim 6 comprising up to 5 percent by weight of said polysaccharide.

8. The composition of claim 7 comprising up to 2 percent by weight of said polysaccharide.

9. The composition of claim 6 wherein said polysaccharide comprises a starch.

10. The composition of claim 6 comprising up to 3 percent by weight of d-limonene.

11. The composition of claim 1 formed from a concentrate by dilution with water.

12. A cleaning composition for removing an adhesive from a hard substrate comprising:

a) 49.35 percent by weight of water;

b) 49.35 percent by weight of urea;

c) 1.0 percent by weight sodium sulfosuccinate solution;

d) 0.2 percent by weight of a defoamer; and e) 0.1 percent by weight of a preservative.

* * * * *